United States Patent
Kenny et al.

[11] Patent Number: 5,909,560
[45] Date of Patent: Jun. 1, 1999

[54] TARGET PERIPHERAL DEVICE DETECTION IN A MULTI-BUS SYSTEM

[75] Inventors: John D. Kenny, Sunnyvale; Steve Wenlung Chang; Emilia Vai-Lun Lei, both of Fremont, all of Calif.

[73] Assignee: National Semiconductor Corporation, Santa Clara, Calif.

[21] Appl. No.: 08/466,627

[22] Filed: Jun. 6, 1995

[51] Int. Cl.[6] .................................................. G06F 13/38
[52] U.S. Cl. ........................ 395/309; 395/306; 395/308; 395/282; 395/829; 395/836; 395/828
[58] Field of Search .................................. 395/309, 828, 395/829, 830, 835, 838, 836, 839, 800, 281, 282, 283, 822, 306, 308

[56] References Cited

U.S. PATENT DOCUMENTS

| | | | |
|---|---|---|---|
| 5,134,706 | 7/1992 | Cushing et al. | 395/733 |
| 5,142,672 | 8/1992 | Johnson et al. | 395/500 |
| 5,146,572 | 9/1992 | Bailey et al. | 395/425 |
| 5,162,675 | 11/1992 | Olsen et al. | 307/465 |
| 5,163,833 | 11/1992 | Olsen et al. | 439/61 |
| 5,191,657 | 3/1993 | Ludwig et al. | 395/308 |
| 5,218,681 | 6/1993 | Gephardt et al. | 395/287 |
| 5,263,172 | 11/1993 | Olnowich | 395/800 |
| 5,287,460 | 2/1994 | Olsen et al. | 395/275 |
| 5,290,178 | 3/1994 | Ma | 439/652 |
| 5,301,281 | 4/1994 | Kennedy | 395/325 |
| 5,309,568 | 5/1994 | Ghosh et al. | 395/325 |
| 5,353,423 | 10/1994 | Hamid et al. | 395/425 |
| 5,367,689 | 11/1994 | Mayer et al. | 395/309 |
| 5,369,748 | 11/1994 | McFarland et al. | 395/325 |
| 5,371,880 | 12/1994 | Bhattacharya | 395/550 |
| 5,379,386 | 1/1995 | Swarts et al. | 395/325 |
| 5,386,517 | 1/1995 | Sheth et al. | 395/275 |
| 5,388,227 | 2/1995 | McFarland | 395/325 |
| 5,414,814 | 5/1995 | McKim | 395/821 |
| 5,434,983 | 7/1995 | Yaso et al. | 395/308 |
| 5,469,554 | 11/1995 | Tucker et al. | 395/420 |
| 5,517,646 | 5/1996 | Piccirillo et al. | 395/700 |
| 5,530,895 | 6/1996 | Enstrom | 395/829 |
| 5,537,663 | 7/1996 | Belmont et al. | 395/837 |
| 5,548,782 | 8/1996 | Micheal et al. | 395/835 |
| 5,551,053 | 8/1996 | Nadolski et al. | 395/829 |
| 5,555,430 | 9/1996 | Gephardt et al. | 395/800.01 |
| 5,559,965 | 9/1996 | Oztaskin et al. | 395/284 |
| 5,590,377 | 12/1996 | Smith | 395/842 |
| 5,594,873 | 1/1997 | Garrett | 395/281 |
| 5,621,900 | 4/1997 | Lane et al. | 395/300 |
| 5,625,847 | 4/1997 | Ando et al. | 395/880 |
| 5,628,027 | 5/1997 | Belmont | 395/821 |
| 5,634,075 | 5/1997 | Smith et al. | 395/829 |
| 5,640,594 | 6/1997 | Gibson et al. | 395/821 |
| 5,680,556 | 10/1997 | Begun et al. | 395/311 |

*Primary Examiner*—Ayaz R. Sheikh
*Assistant Examiner*—Raymond N Phan
*Attorney, Agent, or Firm*—Limbach & Limbach LLP

[57] ABSTRACT

An apparatus and method for identifying devices on a passive type bus such as an ISA bus where peripheral devices do not identify themselves to the host CPU. The apparatus and method of the present invention has particular application to systems where more than one passive (e.g., ISA type) bus may be implemented and a host CPU has no indication as to which bus a device is coupled to. The data lines of the bus are tied through a pull-up circuit to a logical high level voltage ($V_{CC}$) such that, for example in a sixteen-bit data bus, the output data is FF hexadecimal. When a read request is generated on the bus, the bus controller detects whether the data on the bus changes from FF hexadecimal. If a change is detected, then the address device is present on that bus. If the addressed device outputs a data value of FF hexadecimal, that data value is passed through as valid data.

2 Claims, 3 Drawing Sheets

TARGET PERIPHERAL DEVICE DETECTION IN A MULTI-BUS SYSTEM

CROSS-REFERENCE TO RELATED APPLICATIONS

The subject matter of this application is related to that in copending U.S. application Ser. No. 08/130,090 filed Sep. 30, 1993 entitled "Automatic Bus Setting, Sensing and Switching Interface Unit" and incorporated herein by reference.

FIELD OF THE INVENTION

The present invention relates to an apparatus and method for identifying a target peripheral device in a multiple bus system. The invention has particular application in to computer systems containing multiple ISA buses.

BACKGROUND OF THE INVENTION

Over a decade ago the IBM™ PC AT set the standard for the burgeoning personal computer (PC) industry. Today, IBM™ compatible architectures make up approximately 90% of the PC marketplace. Along side the tremendous growth of the PC market itself there has also grown up a very large market for add-on peripheral devices of all types. Because of the dominance of the IBM PC AT architecture, its peripheral bus, the so-called "AT" or "ISA" (Industry Standards Association) bus has become the dominant standard for connecting add-on peripheral devices to a PC system. The operation of ISA bus type computer systems is described in more detail in ISA System Architecture (New Revised Edition) by Tom Shanley and Don Anderson (©1991 and 1993, Mindshare Press, 2202 Buttercup Drive, Richardson Tex. 75802, ISBN 1-881609-05-7) and incorporated herein by reference.

After more than ten years in use, however, the limitations of the ISA bus have caused a growing movement to define newer, more advanced peripheral buses. Two of the largest drawbacks to the ISA bus are its low level of performance, by today's standards, and that it may be very difficult to configure peripheral devices on an ISA bus as they give no explicit indication of their presence in the system or of their support requirements.

At present, the recently defined advanced peripheral bus, the so-called "PCI" bus is gaining momentum and looks likely to become the standard peripheral bus for a next generation of PCs. The operation of PCI bus type computer systems is described in more detail in PCI System Architecture (New Expanded Edition Rev 2.0 Compliant) by Tom Shanley (©1993, Mindshare Press, 2202 Buttercup Drive, Richardson Tex. 75802, ISBN 1-881609-08-1) and incorporated herein by reference. However, new bus designs, such as the PCI bus, may have substantial obstacles and problems to overcome. Although newer bus type designs have technological advantages over the ISA bus design, there exists a large installed base of ISA bus type computers and compatible software. For the purposes of this application, these ISA bus type computers will be referred to as "legacy" computers or systems.

In order to provide a computer system which has the advantages of a new (e.g., PCI) bus design, it may be desirable to provide a computer with both PCI and ISA compatible buses. FIG. 1 illustrates an example of such a system. As shown in FIG. 1, a computer (e.g., PC, laptop, notebook or the like) may be provided with a CPU 100, a CPU interface to PCI Host controller 110 (hereinafter "PCI host controller") and a PCI bus 120. A number of peripheral devices 130,140 compatible with PCI bus architecture may be coupled to PCI bus 120. Such devices may include I/O controllers, memory, video controllers, hard drive controllers, or the like. A number of such devices may be provided coupled to PCI bus 120, however, for the purposes of illustration only two such devices 130,140 are shown here.

In addition to devices 130,140, a Primary PCI to ISA controller 150 (hereinafter "ISA controller") may be coupled to PCI bus 120. ISA controller 150 is itself a PCI bus compatible device and may be read from or written to through PCI bus 120 in a manner similar to devices 130,140. ISA controller 150 is coupled to ISA bus 160. ISA bus compatible devices 170,180 may be coupled to ISA bus 160. ISA bus compatible devices 170,180 may comprise any one of a number of peripheral devices compatible with the ISA bus architecture.

The dual bus system of FIG. 1 provides both PCI and ISA bus compatibility for both hardware and software. As the amount of Legacy hardware and software in existence is large, it is preferable to provide such a dual-bus system which is backwardly compatible.

However, the system of FIG. 1 may present some difficult hardware and software design problems. For example, the fundamental bus architecture of the ISA bus and PCI bus are different. The PCI bus is a synchronous bus, using an internal PCI bus clock to regulate the transfer of data and bus cycles. The ISA bus is an asynchronous bus architecture. Moreover, an ISA bus type computer system must be provided with direct memory access (DMA) channels and ISA type interrupt levels (IRQ) not present in the PCI type bus system. ISA controller 150 may be provided to convert ISA interrupt requests and generic ISA bus cycles into PCI compatible bus cycles, however there is no mechanism for handling DMA cycles.

While the use of such a controller may be suitable for a system having a single ISA bus, additional problems may be created if multiple ISA bus controllers are used. For example, for a portable computer, it may be desirable to provide a so-called docking station with a PCI bus interface. The docking station may be provided with a PCI to ISA bus interface controller to drive ISA bus compatible peripheral devices. If the portable computer also has an ISA to PCI bus interface controller, two ISA type buses may be present in one computer system at the same time. Since, as noted above, peripherals on an ISA system do not provide explicit indication of their presence on the ISA bus, it may be difficult to address ISA devices for read and write operations.

SUMMARY AND OBJECTS OF THE INVENTION

An apparatus for detecting the presence of a peripheral device on a bus system includes a bus controller for receiving a device address and control information from a host computer, outputting the device address and control information respective address and control lines on the bus system, and receiving and transmitting data to and from the bus system. A pull-up circuit is provided for holding at least one data line of the data bus to a predetermined level in the absence of any data signals on the data bus. The bus controller detects the presence of a peripheral device on the data bus by observing the transition of the data bus from the predetermined level to another level in response to the device address and command signals.

The bus controller outputs a predetermined data value equivalent to the value of data on the data bus when at least one data line of the data bus is held to a predetermined level and data on the data bus remains at the predetermined level.

It is therefore an object of the present invention to identify the presence of a peripheral device on a system bus where the peripheral device does not provide a means for explicitly identifying itself.

It is a further object of the present invention to identify the presence of a peripheral device on one of a number of system buses where the peripheral device does not provide a means for explicitly identifying itself.

It is a further object of the present invention to write to a peripheral device located on one of a number of system buses where the location of the peripheral device is not known.

It is a further object of the present invention to read data from a peripheral device located on one of a number of system buses where the location of the peripheral device is not known.

BRIEF DESCRIPTIONS OF THE DRAWINGS

DETAILED DESCRIPTION OF THE INVENTION

Figure 2:
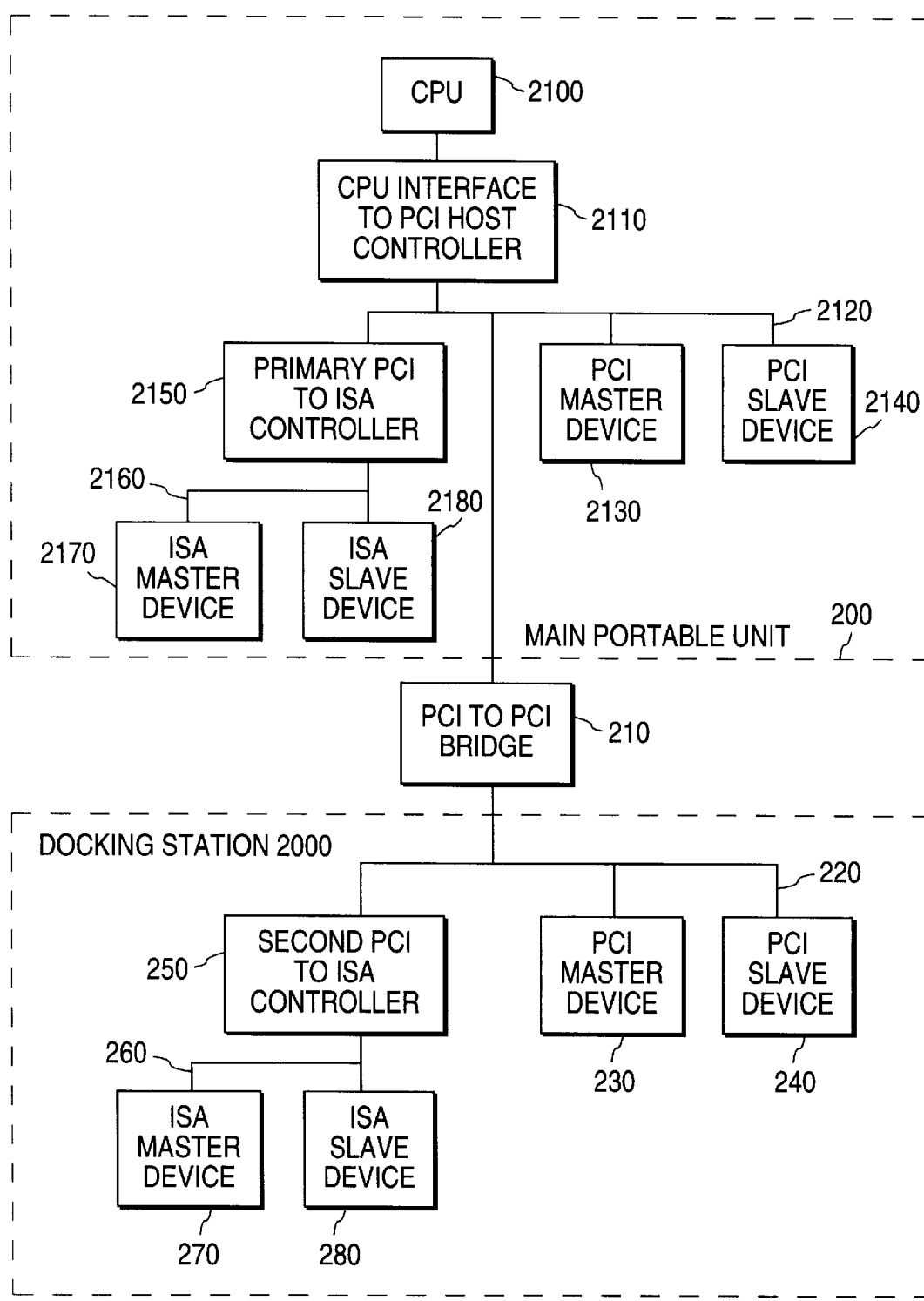
FIG. 2 is a block diagram illustrating a computer with two ISA buses as used, for example, in a portable computer combined with a docking station.

FIG. 2 is a block diagram illustrating a computer with two ISA buses as used, for example, in a portable computer combined with a docking station. While illustrated here for use with a portable computer and docking station, the present invention may be similarly applied to other computer systems where more than one bus of the same type may be employed, without departing from the spirit and scope of the invention.

Figure 1:
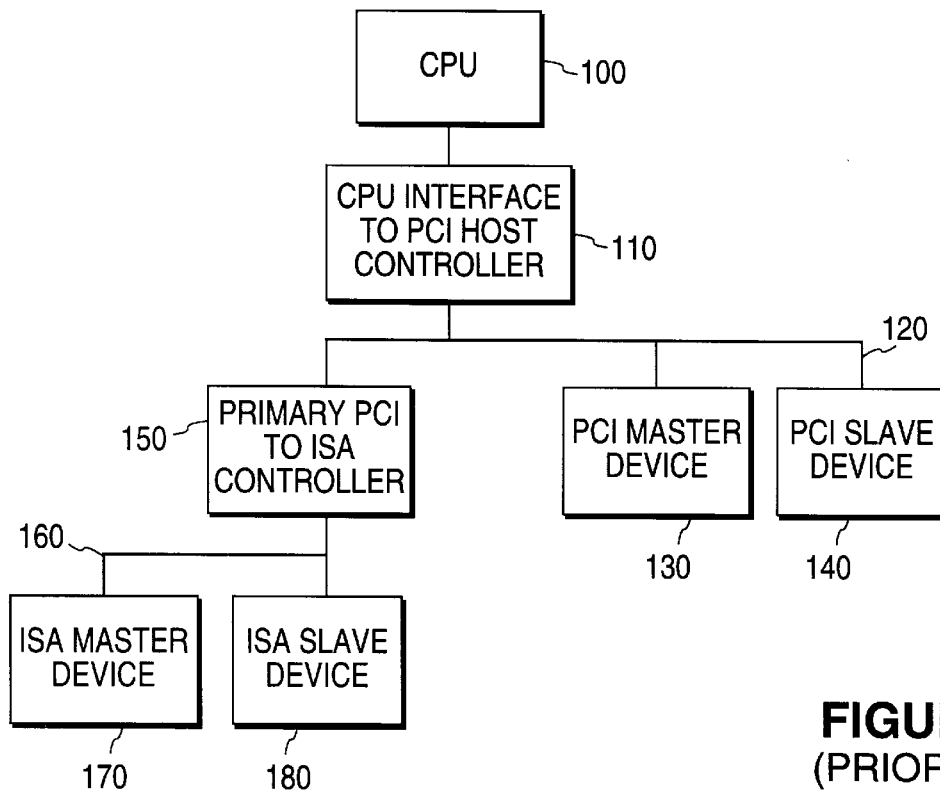
FIG. 1 is a block diagram illustrating a prior art combined bus system with an ISA to PCI bus interface controller.

Main portable unit 200 may be constructed in a manner similar to that of the dual-bus computer of FIG. 1. Main portable unit 200 may be provided with a CPU 2100, a CPU interface to PCI Host controller 2110 (hereinafter "PCI host controller") and a PCI bus 2120. A number of peripheral devices 2130, 2140 compatible with PCI bus architecture may be coupled to PCI bus 2120. Such devices may include I/O controllers, memory, video controllers, hard drive controllers, or the like. A number of such devices may be provided coupled to PCI bus 2120, however, for the purposes of illustration only two such devices 2130, 2140 are shown here.

In addition to devices 2130, 2140, a Primary PCI to ISA controller 2150 (hereinafter "ISA controller") may be coupled to PCI bus 2120. ISA controller 2150 is itself a PCI bus compatible device and may be read from or written to through PCI bus 2120 in a manner similar to devices 2130, 2140. ISA controller 2150 is coupled to ISA bus 2160. ISA bus compatible devices 2170, 2180 may be coupled to ISA bus 2160. ISA bus compatible devices 2170, 2180 may comprise any one of a number of peripheral devices compatible with the ISA bus architecture.

It should be noted that ISA controller 2150 may be configured in a different manner than ISA controller 150 of FIG. 1 in order to provide the bus control techniques of the present invention, as will be discussed in more detail below.

A docking port comprising PCI bridge 210 may be provided between main portable unit 200 and docking station 2000. A docking port may connect a portable PC to a docking station which provides peripheral expansion and extended interconnect capabilities not typically available on Main portable unit 200. A logical choice for a docking port interface is the PCI bus because of its higher performance and lower pin count.

PCI bridge 210 couples PCI bus 2120 within main portable unit 200 to PCI bus 220 in docking station 2000, forming one contiguous PCI bus. Alternately, PCI bus 2120 and PCI bus 220 may be formed as separate, discrete buses. As the PCI bus protocol provides that each peripheral device on the bus identify itself to the host computer, the use of plural PCI buses may not present difficulty in addressing and controlling peripheral devices.

However, peripheral devices constructed according to the ISA bus standard may not be provided with means to identify their presence to a host computer. For the purposes of this application, bus designs, such as the ISA bus, in which devices do not actively identify their presence to a host will be referred to as "passive" bus designs. Thus, if CPU 2100 is to read or write data to one of ISA devices 2170, 2180, 270 or 280, it may be necessary to know which of ISA buses 2160 or 260 that a device is coupled to.

To write data to one of devices 2170, 2180, 270 or 280, CPU 2100 may write data to both ISA controller 2150 and ISA controller 250, which in turn may write that data to their respective buses 2160 and 260. In the ISA bus standard, data written on the ISA bus during a write cycle is addressed to a particular peripheral device using an I/O address assigned to that peripheral device. Other devices having different I/O addresses ignore such data. Thus, it is possible to broadcast write data on both ISA buses 2160 and 260 and successfully communicate with a peripheral device, without specifying which of ISA buses 2160 or 260 a peripheral device is coupled to.

ISA controller 2150 may generate a signal IOCHRDY (IO channel ready) indicating whether the ISA bus read or write cycle has been completed. The signal IOCHRDY may be essentially the sum of signals ISARDY (ISA bus channel ready) from each of controllers 250 and 2150. Controller 2150, as the primary controller, may receive a ISARDY signal from secondary ISA controller 250 (and other ISA controllers, if present) and combine these signals to form PCI bus signal TRDY to output to PCI host controller 2110. Signal TRDY indicates that ISA controller 2150 has completed a PCI bus cycle.

Signal ISARDY may not be a standard PCI bus control signal according to present versions of the PCI specification. However, this signal may be transmitted as a so-called "sideband" signal, using one of a number of unused connections on the PCI bridge connector 210. If an IOCHRDY signal is not received at the end of a write cycle, ISA bridge 2150 will extend the write cycle by a number of predetermined clock cycles. The process is repeated until a read or write cycle has been completed.

For all bus cycles initiated from any source on PCI bus 2120, 220 any PCI target device 2130, 2140, 230, 240 may claim the bus cycle by driving PCI bus signal DEVSEL# within four clock cycles. The device claiming the bus cycle may then claim and complete a PCI bus cycle. During that claimed bus cycle, all other devices on PCI bus 220, 2120, including ISA controllers 2150, 250 must ignore the cycle.

If a PCI write cycle times out (e.g., four clock cycles without a DEVSEL# signal) and no PCI device 2130, 2140, 230, 240 has claimed the cycle, then primary ISA controller 2150 may tentatively claim the cycle on behalf of all ISA controllers in the system (e.g., ISA controllers 2150, 250). Each ISA controller then executes the designated write cycle.

If any ISA device 2170, 2180, 270, 280 pulls low the IOCHRDY line on ISA buses 2160 or 260, then an indirect indication is given that the target peripheral device is present. The corresponding ISA controller, if not the primary controller, (e.g., ISA controller 250) may then pull low the ISARDY signal to signal primary ISA controller 2150 not to terminate the cycle at the standard ISA timeout. If the corresponding controller is primary controller 2150, signal IOCHRDY may be detected on ISA bus 2160. Whichever ISA controller detects the target peripheral device may then be responsible for terminating the PCI cycle once the ISA cycle is complete.

If no IOCHRDY signal is pulled low on either of ISA buses 2160 or 260, then either the target peripheral device is not present in the system or the target peripheral device has received its data within the default ISA cycle timing and the ISA cycle is complete. In either case, the appropriate response may be to complete the PCI cycle at the completion of the default ISA cycle. Thereby, if no target device is detected by the signal IOCHRDY on either ISA bus 2160 or 260, then after completion of ISA standard write cycle primary ISA controller 2150 may automatically complete the PCI write cycle.

Reading data from a peripheral device 2170, 2180, 270 or 280 may present some additional complications. Under ordinary circumstances, an ISA type bus is tri-stated between bus cycles. Thus, any data appearing on the data lines of the ISA bus may remain there until replaced with other data. Thus, if an attempt is made to read data from both buses 2160 or 260, the resultant data (ANDed or ORed together) would be invalid. One bus containing the addressed device may output valid data, whereas the other bus may output invalid data. CPU 2100 has no way of determining which bus is outputting invalid data or which bus is outputting valid data from the addressed peripheral device.

Figure 3:
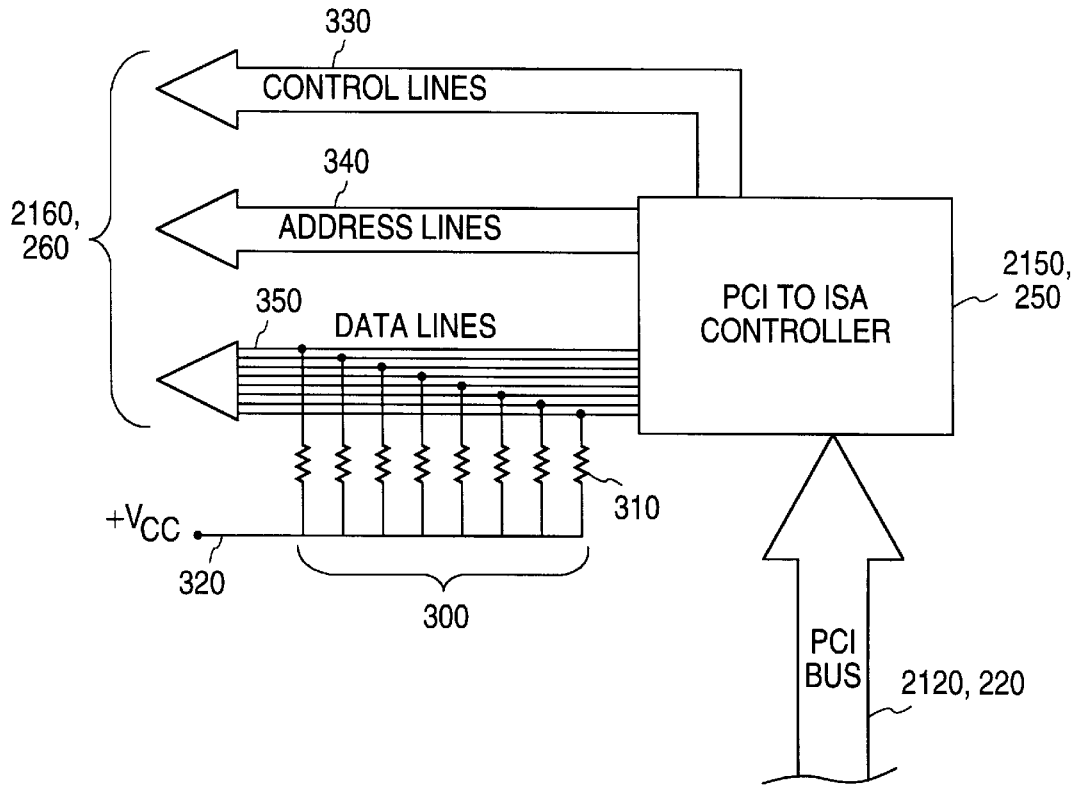
FIG. 3 is a block/schematic diagram illustrating one aspect of the apparatus of the present invention.

FIG. 3 is a block/schematic diagram illustrating one aspect of the apparatus of the present invention. For the sake of illustration, FIG. 3 illustrates this aspect of the present invention as applied to ISA controller 2150. However, it can be appreciated that the same or similar circuits may also be implemented in ISA controller 250 or other secondary ISA controllers.

In FIG. 3, ISA controller 2150 or 250 is coupled to PCI bus 2120 or 220 to receive and transmit address, data and commands (e.g., read/write). ISA controller 2150, 250 translates PCI data, addresses and commands into ISA bus data, addresses and commands and vice versa. ISA bus 2160, 260 may comprise control lines 330, address lines 340, and data lines 350 as is known in the art. Data lines 350 may comprise, for example, eight data lines. However for other types of bus architectures within the spirit and scope of the present invention, other numbers of data lines may be employed.

For each of ISA controller 2150 and 250 is provided a pull-up circuit 300. For the sake of illustration the pull-up circuit is shown external to ISA controller 2150 or 250. However, it can be appreciated that such a pull-up circuit may be provided internal to ISA controller 2150 or 250.

Pull-up circuit 300 may comprise a number of pull-up resistors 310, each coupled to a respective data line of data lines 350. For other bus types, an appropriate number of pull-up circuits may be provided. Pull-up circuit 300 is illustrated here as number of pull-up resistors 310 coupled to supply voltage $V_{CC}$ 320. It can be appreciated that in practice, a resistor may be impractical to implement in an integrated circuit and that pull-up circuit 3020 may be implemented using equivalent transistor technology.

Resistor 310 may take a value of 5 to 100 Kilo-Ohms. When no data is asserted on ISA bus 2160, pull-up circuit 300 pulls all data lines 350 to a high ($V_{CC}$) voltage state. Thus, when no device is driving data on ISA bus 2160 or 260, the value for data on the bus is binary 11111111 or FF hexadecimal. Resistors 310 act as a weak pull-up resistors. Thus, when a device on ISA bus 2160 or 260 drives data on to ISA bus 2160 or 260, the value of data on the bus changes accordingly. This change in data value may be utilized as a signal to indicate which of ISA buses 2160 or 260 contains the peripheral device to be addressed.

Each of ISA controllers 250 and 2150 may be provided with such a target peripheral device detection circuit to detect data transitions as the primary means of target detection. In addition, the signal IOCHRDY generated on each local ISA bus may also be monitored to contribute to determining when to terminate each PCI to ISA cycle. If a target peripheral device on one of ISA busses 2160 or 260 pulls signal IOCHRDY low, this signal indicates that the target device wants to extend the ISA bus cycle by adding wait states for as long as IOCHRDY remains low. If secondary ISA controller 250 sees IOCHRDY low, this information may be transmitted back to the primary ISA controller 2150 as sideband signal ISARDY to signal it to extend the PCI cycle beyond the standard ISA timeout. Both ISA controllers 2150 and 250 (primary and secondary) should drive the status of its collector driver with a pull-up resistor in order to allow multiple ISA controllers to share this function. Primary ISA controller 2150 may also treat the ISARDY signal as an input which it will use to determine when any ISA target device wants to exceed the ISA bus cycle.

Thus, although an ISA device does not provide an explicit indication to a host as to its presence as does a PCI device, it is nevertheless possible to detect the presence of an ISA device utilizing an inherent background feature of each prior art ISA device, the ability to drive data on an ISA bus.

The operation of the PCI bus cycle for a read cycle is similar to that of the write cycle discussed above. If a PCI read cycle times out (e.g., four clock cycles without a DEVSEL# signal) and no PCI device 2130, 2140, 230, 240 has claimed the cycle, then primary ISA controller 2150 may tentatively claim the cycle on behalf of all ISA controllers in the system (e.g., ISA controllers 2150, 250). Each ISA controller then executes the designated read cycle.

If any ISA device pulls low the IOCHRDY line, an indirect indication is given that the target peripheral device is present on that bus. The corresponding ISA controller (e.g., ISA controller 250) pulls low the ISARDY line to signal primary ISA controller 2150 not to terminate the cycle at ISA standard timeout. Primary ISA controller may detect the presence of a target peripheral device by monitoring the presence of signal IOCHRDY on its own ISA bus 2160. The ISA controller detecting the target peripheral device is then responsible for terminating the PCI cycle once the ISA cycle is complete.

If none of the IOCHRDY lines on ISA buses 2160, 260 have been pulled low, and if any data is sampled low at the end of the standard ISA read cycle (after being precharged high by pull-up circuit 300), an indirect indication is again made that the target peripheral device is present. Again, the ISA controller 2150 or 250 detecting the presence of the peripheral device is responsible for terminating the PCI cycle once the ISA cycle is complete. In the preferred embodiment, an active circuit may be used to create the precharge rather than the resistors illustrated in FIG. 3.

Figure 4:
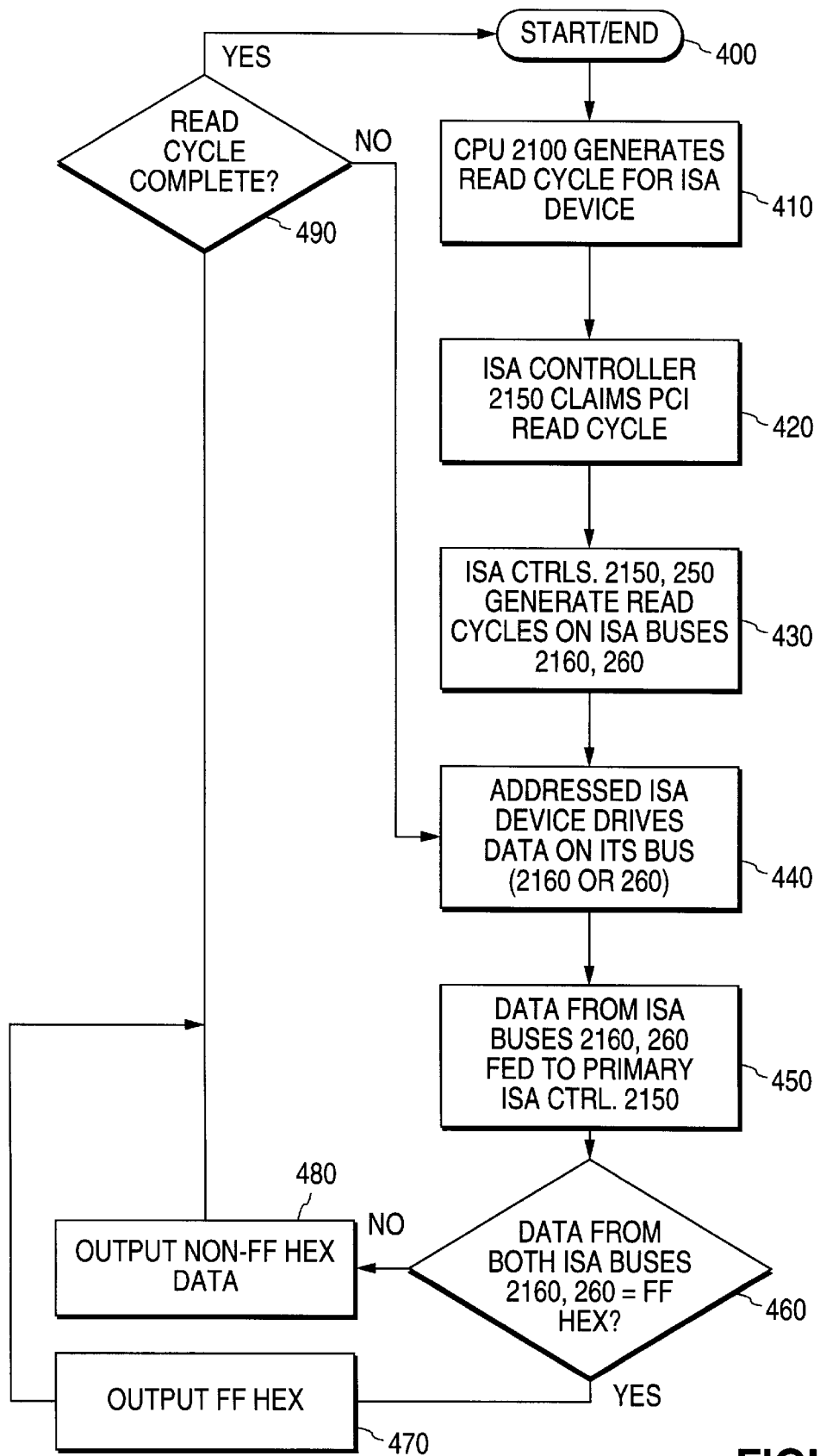
FIG. 4 illustrates the steps in reading data from the ISA buses of the apparatus of FIG. 2.

FIG. 4 illustrates the steps carried out in reading data from either ISA buses 2160 or 260. In step 410, CPU 2100 may generates read cycle intended for an ISA device on one of ISA buses 260 or 2160. As the read command is intended for an ISA device, none of PCI devices 2130, 2140, 230 or 240 should claim the cycle and the PCI write cycle times out (e.g., four clock cycles without a DEVSEL# signal). In step 420, primary ISA controller 2150 may tentatively claim the cycle on behalf of all ISA controllers in the system (e.g., ISA controllers 2150, 250).

In step 430, ISA controllers 2150 and 250, having received a ISA device read request, generate local ISA bus read cycles on their respective ISA buses 2160, 260 by generating a device address on the address lines of ISA buses 2160 and 260 and indicating a read cycle through control lines of ISA buses 2160 and 260.

Pull-up circuits 300 within each of ISA controller 2150 and 250 has pulled the data lines of ISA buses 2160 and 260 high. It is presumed for the sake of FIG. 4 that the device addressed is a valid ISA device (2170, 2180, 270, or 280) present on one of ISA buses 2160 and 260. Furthermore, it is presumed that the overall system is properly configured such that no two ISA devices (2170, 2180, 270, 280) have the same I/O address (device address conflict).

In step 440, the addressed ISA device drives data on the data lines of its respective bus in response to the address and read signals. Thus, one of ISA buses 2160 and 260 is driving valid data while the other is pulled high to FF hexadecimal. In step 450, data from ISA buses 2160 and 260 is fed to ISA controller 2150. In the case of data from ISA bus 260, this data is fed through ISA controller 250 to PCI bus 220 through PCI bridge 210 to PCI bus 2120 to ISA controller 2150.

In step 460, the data received from each bus is compared to the pull-up value (FF hexadecimal). If data on both ISA buses 2160 and 260 is FF hexadecimal, then FF hexadecimal is output from ISA controller 2150 to PCI bus 2120 as shown in step 470. If data on one of ISA buses 2160 and 260 is not FF hexadecimal, it is presumed that that bus is generating valid data and that data is output to PCI bus 2120 from ISA controller 2150.

ISA controller 2150 is designated as the "primary" ISA controller, whereas ISA controller 250 acts as a secondary or slave controller. For purposes of controlling and directing data to and from ISA buses 2160 and 260, ISA controller 2150 may receive data from ISA controller 250 through PCI bus 2120. ISA controller 2150 may then act as primary interface between ISA buses 2160 and 260 and CPU 2100. Centralizing control of ISA buses 2160 and 260 is one of the features of the present invention.

As illustrated in FIG. 4, ISA controller 2150 may determine which of ISA buses 2160 or 260 is coupled to the addressed device by monitoring on which of buses 2160 and 260 the data value changes from the pull-up value of FF hexadecimal. However, there is one case in which it may be difficult to determine which bus contains the addressed device. If the output data from the addressed device is FF hexadecimal, or if there is no target device present, ISA controller 2150 cannot determine which of ISA buses 2160 or 260 is coupled to the addressed device. In this instance, since the intended output data is FF hexadecimal, no decision is made as to which bus a device is coupled to and the resultant data (FF hexadecimal) is passed to PCI bus 2150.

Of course, the process of FIG. 4 assumes that a valid device at a particular address is coupled to one of ISA buses 2160 or 260. If no such device at that address is coupled to either of ISA buses 2160 or 260, the data output would remain at FF hexadecimal. Of course, a similar situation exists in a legacy type PC when a non-existent device is addressed. In a legacy type PC if a non-existent device is addressed, returned data will be FF as no device is present to drive the bus.

The apparatus and method of the present invention detects the presence of an ISA type device on one of two ISA buses by pulling up the data lines of each ISA bus to a high (FF hexadecimal) value and detecting a transition of the data lines on each bus to another data value. By utilizing this inherent feature of ISA devices, the apparatus and method of the present invention may be backward-compatible with legacy type PCs. Moreover, the apparatus and method of the present invention may be readily and economically implemented without an extensive amount of additional hardware.

While the preferred embodiment and various alternative embodiments of the invention have been disclosed and described in detail herein, it may be apparent to those skilled in the art that various changes in form and detail may be made therein without departing from the spirit and scope thereof.

For example, the apparatus and method of the present invention has been described for use in a dual ISA bus system where, for example, a portable computer may dock with a docking station. However, the apparatus and method of the present invention may be applied to other types of computer systems where multiple ISA or other passive bus types may be used. Moreover, the apparatus and method of the present invention may be applied to so-called "plug and play" systems where it may be desirable to identify different peripheral devices on a passive bus systems such as an ISA bus. For example, a CPU could be programmed to poll all device addresses on an ISA bus and then detect the presence of ISA devices by detecting the transition of the data lines on an ISA bus from FF hexadecimal to another data value.

In addition, while the pull-up circuit in the present invention has been described for pulling all data lines of a data bus high in the absence of any asserted data on the bus, it is entirely within the spirit and scope of the present invention to hold only one or more data lines high using a pull-up circuit. For example, a particular data line (e.g., LSB, MSB) may be selected on the basis that such a data line may characteristically go low when data is driven on the bus.

It should also be noted that while the present invention describes a pull-up circuit for use in detecting the presence of an ISA device on the bus, a pull-down circuit may also be used for similar effect. One or more data lines may be pulled low (i.e., to ground) in the absence of any data asserted on the bus. The ISA controller may then detect the presence of an ISA device on the bus by observing the transition from low to high of one or more data lines on the bus. Similarly, a number of data lines may be held high and a number held low (or a third number tristated) such that the detected value may take on a number other than FF hexadecimal.

Further, it should be noted that while the present invention is illustrated with two ISA buses 2160 and 260, other numbers of ISA buses and ISA controllers may be added to the system. Additional secondary controllers may be added, each communicating with primary ISA controller 2150 by generating sideband signal ISARDY on PCI bus 2120,220. Thus, the present invention may be expanded to include three or more ISA busses and corresponding controllers.

What is claimed is:

1. Apparatus for detecting a peripheral device coupled to a selected bus in a bus system that includes a plurality of buses, wherein each bus includes a data portion, an address portion and a control portion, the apparatus comprising:

a bus controller coupled to a host computer and to each of the buses to receive device address information and device control information from the host computer, to provide the device address information and the device control information on the address portion and the control portion, respectively, of each of the buses, and to receive and transmit data signals from and to, respectively, the data portion of each of the buses, the peripheral device responding to the device address information and the device control information on the selected bus by providing a data signal having a first predefined signal level on the data portion of the selected bus;

a pull-up circuit, coupled to the data portion of each of the buses, that, simultaneously, for each bus that has an absence of a data signal on the data portion of said bus, holds the data portion of each said bus at a second predefined signal level different than the first predefined signal level; and wherein the bus controller includes means for distinguishing between the first predefined signal level and the second predefined level such that the apparatus detects connection of the peripheral device to the selected bus.

2. A method of detecting a peripheral device coupled to a selected bus in a bus system that includes a plurality of buses, wherein each bus includes a data portion, an address portion and a control portion, the method comprising the sequential steps of:

simultaneously holding the data portion of each bus at a predefined signal level in an absence of a data signal on said data portion;

providing a device read address and a read command control signal on the address portion and the control portion, respectively, of each bus, the peripheral device responding to the device read address and the read command control signal by providing a read data signal on the data portion of the selected bus, the read data signal having read signal level different than the predefined signal level; and monitoring the data portion of each bus to detect the read signal level of the read data signal, whereby connection of the peripheral device to the selected bus is detected.

* * * * *